United States Patent [19]

Bunyan

[11] 4,182,518
[45] Jan. 8, 1980

[54] SEALING ARRANGEMENTS

[75] Inventor: Thomas W. Bunyan, London, England

[73] Assignee: Pilgrim Engineering Developments Limited, London, England

[21] Appl. No.: 908,777

[22] Filed: May 23, 1978

[30] Foreign Application Priority Data

Feb. 3, 1978 [GB] United Kingdom ............... 4438/78

[51] Int. Cl.² .................... F16J 15/36; F16J 15/54
[52] U.S. Cl. ................................. 277/65; 277/2; 277/42; 277/59; 277/88
[58] Field of Search ............. 277/2, 38, 39, 42, 43, 277/59, 65, 72 R, 70, 84, 88, 81 R

[56] References Cited

U.S. PATENT DOCUMENTS

| B 367,021 | 1/1975 | Howard et al. ............... 277/2 X |
| 2,127,591 | 8/1938 | Evans ............................. 277/65 X |
| 2,246,277 | 6/1941 | Davidson ....................... 277/88 X |
| 2,467,960 | 4/1949 | Brady ............................. 277/42 X |
| 2,493,152 | 1/1950 | Malcolm ........................ 277/2 X |
| 2,650,117 | 8/1953 | Chambers et al. ............ 277/42 |
| 2,752,176 | 6/1956 | Ayling ........................... 277/42 X |
| 3,306,620 | 2/1967 | Taschenberg ................. 277/84 X |
| 3,391,941 | 7/1968 | Donley .......................... 277/65 X |
| 3,525,529 | 8/1970 | Pfeifer et al. ................. 277/59 X |

FOREIGN PATENT DOCUMENTS

| 1331903 | 6/1963 | France ...................................... 277/38 |
| 982975 | 2/1965 | United Kingdom ..................... 277/2 |

*Primary Examiner*—Robert S. Ward, Jr.
*Attorney, Agent, or Firm*—Woodcock, Washburn, Kurtz & Mackiewicz

[57] ABSTRACT

A sealing arrangement between rotary shafts and structure which surrounds them particularly propeller tailshafts and the stern boss of ships. The sealing arrangement comprises two rubbing seals mounted in series along the shaft between the shaft and structure which surrounds the shaft, with a void space between the seals. A drain conduit extends from the seals and a tun dish is located in the drain conduit to indicate the ingress of fluid into the void. The rubbing seals are formed by the opposite radial faces of an annular flange extending radially out from the shaft and by wear rings biased axially against the opposite sides of the flange.

10 Claims, 7 Drawing Figures

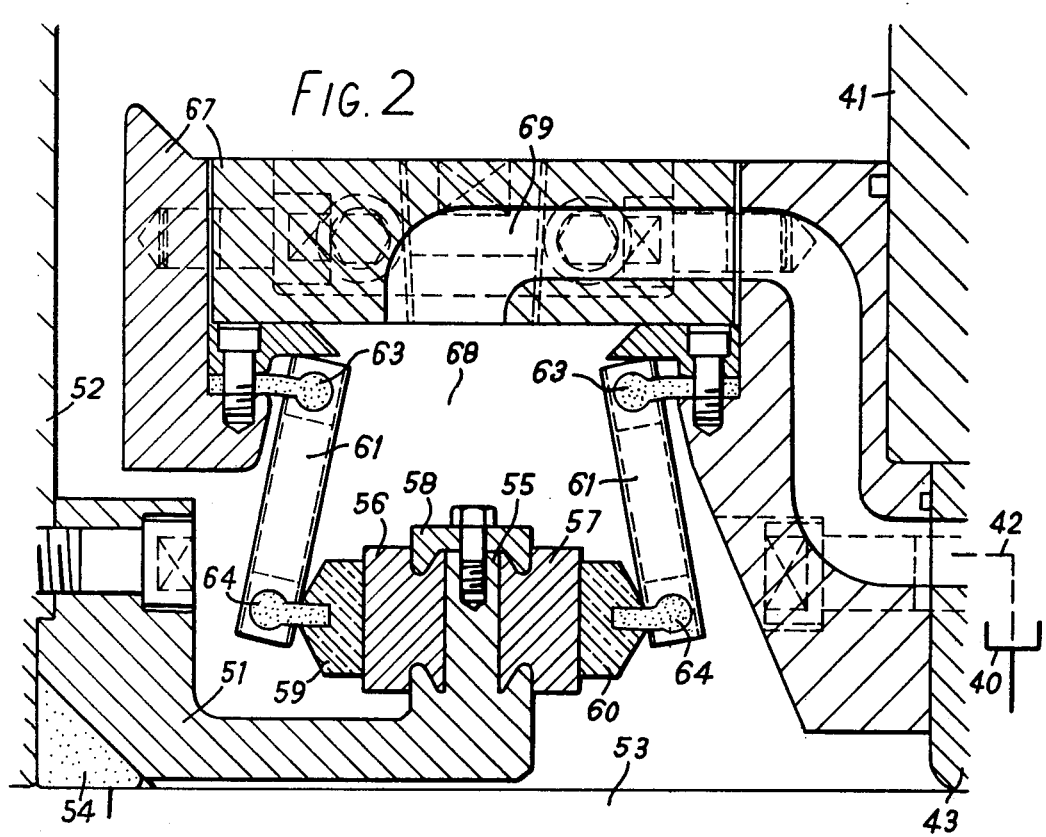
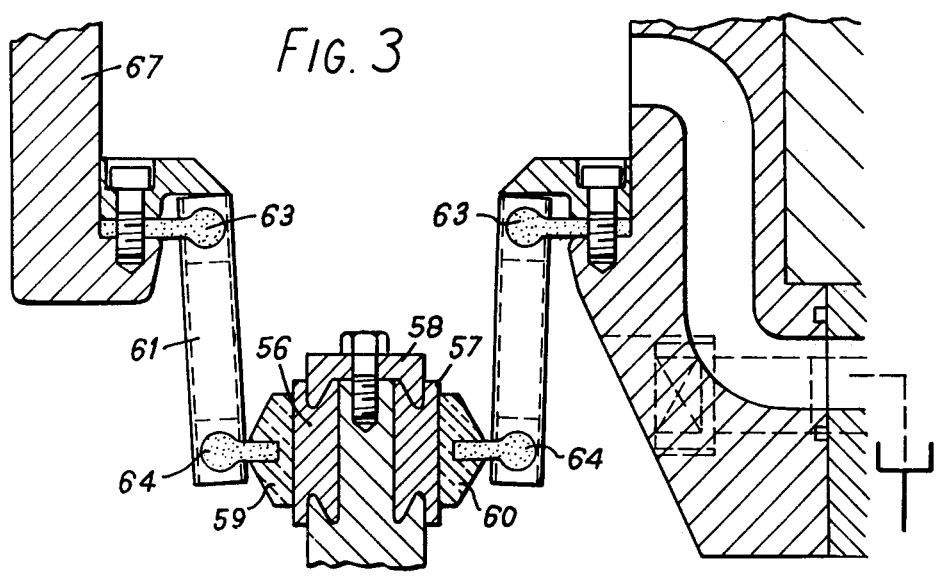

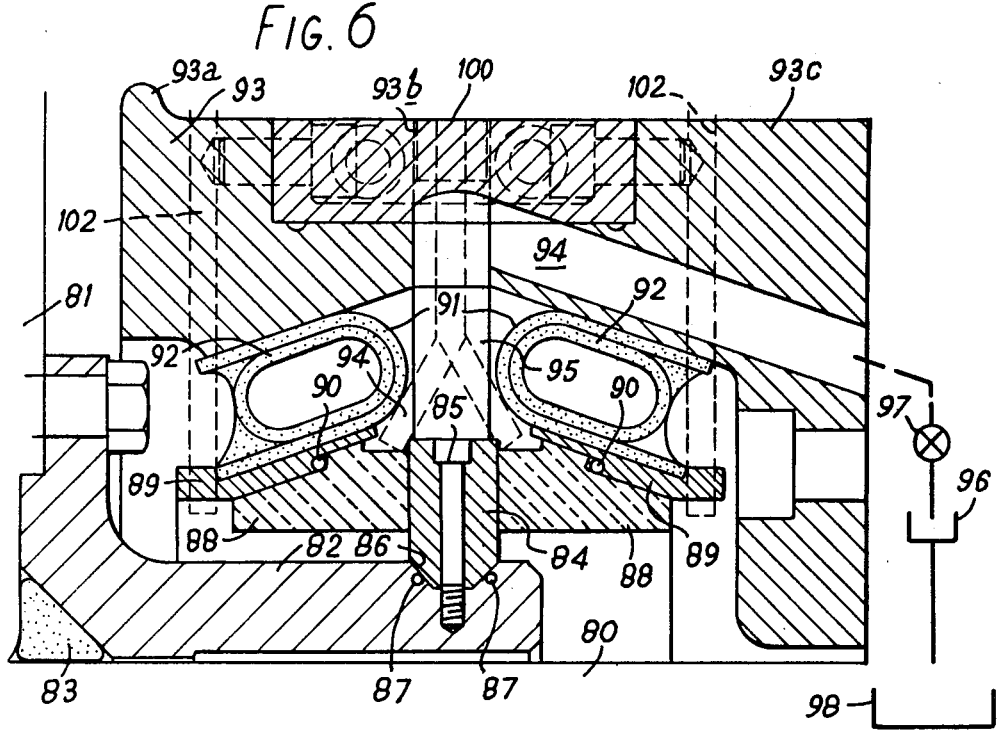
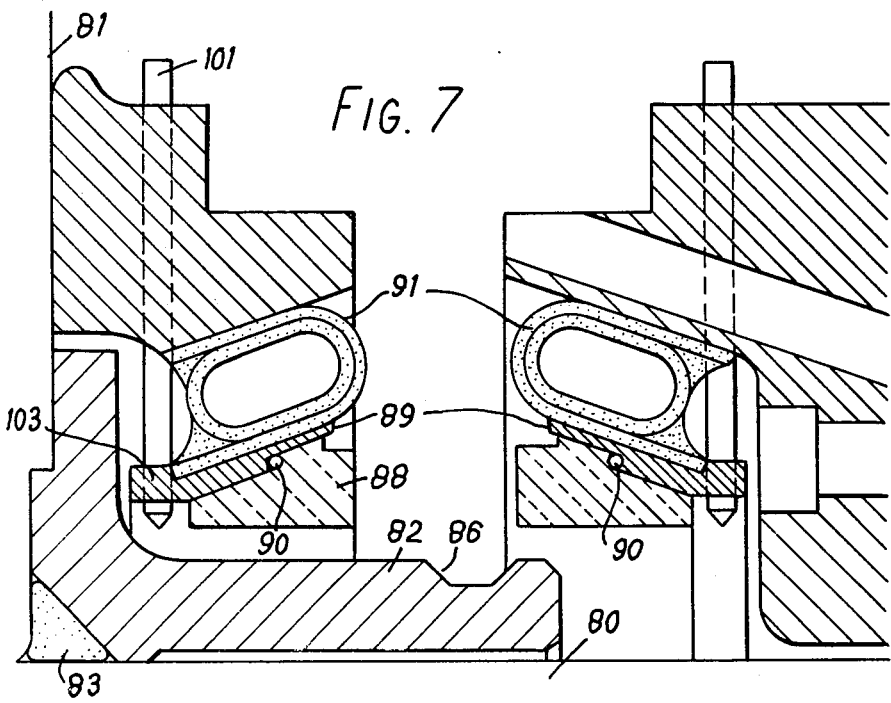

SEALING ARRANGEMENTS

The present invention is concerned with improvements in sealing arrangements between rotary shafts and the structures in which they are mounted and is especially concerned with sealing arrangements for propeller tailshafts on marine vessels.

In marine applications a propeller shaft bearing must be protected against the ingress of sea water. In large ships the sea water may be under a static pressure of 20 meters of water on which is superimposed a pulsating pressure of say ± 10 meters of water due to the ship's motion in the sea way.

Most of the shaft seals used with ships' propeller tailshafts are lip-type seals which comprise a number of nitrile or viton rubber labyrinth sealing rings, each terminating in a sealing lip which is kept in contact with a stainless steel sleeve which surrounds and is secured to the tailshaft. The performance of this seal is limited by rubbing speed and hydrostatic pressure. Service experience has shown it could be unsatisfactory after two years service. Indeed there have been sundry failures during the first voyage. Statistics provided by Lloyd's Register of Shipping have indicated that one in every four seals fitted in new ships with tailshafts in excess of 400 mm diameter will have a reportable seal defect within the first seven years in service. As almost all of the defects are accompanied by varying degrees of oil-leakage pollution of the sea they are a cause of anxiety with the risk of heavy fine or even expulsion from the port of discharge or loading of cargoes.

It is most probable that leakage-prone designs of seal will not be acceptable under forthcoming IMCO regulations.

It is the aim of the present invention to provide a pollution-free seal of greatly improved reliability.

According to the present invention a sealing arrangement for a rotary shaft mounted in bearings comprises two rubbing seals mounted between the shaft and structure surrounding the shaft with a space between the seals and means for indicating ingress of liquid into the space. In the case of a propeller shaft for a marine vessel one of the rubbing seals provides a seal between the sea water and the said space and the other seal provides a seal between the bearing oil and the said space.

In a preferred form of the present invention all wearing parts of the seals may be renewed with the ship afloat or in dry dock in a matter of a few hours with no disturbance of the shafting whatsoever, and requiring no final adjustments as to alignment, concentric running, etc.

Embodiments of the invention will now be described, by way of example, with reference to the accompanying drawings, of which:

FIG. 2 shows a first type of sealing arrangement for a propeller tailshaft according to the invention in the new condition;

FIG. 3 shows the sealing arrangement of FIG. 2 in a worn condition;

FIG. 6 shows a third type of sealing arrangement for a propeller tailshaft according to the invention; and FIG. 7 shows the sealing arrangement of FIG. 6 partly dismantled for replacement of worn sealing rings.

Figure 1:
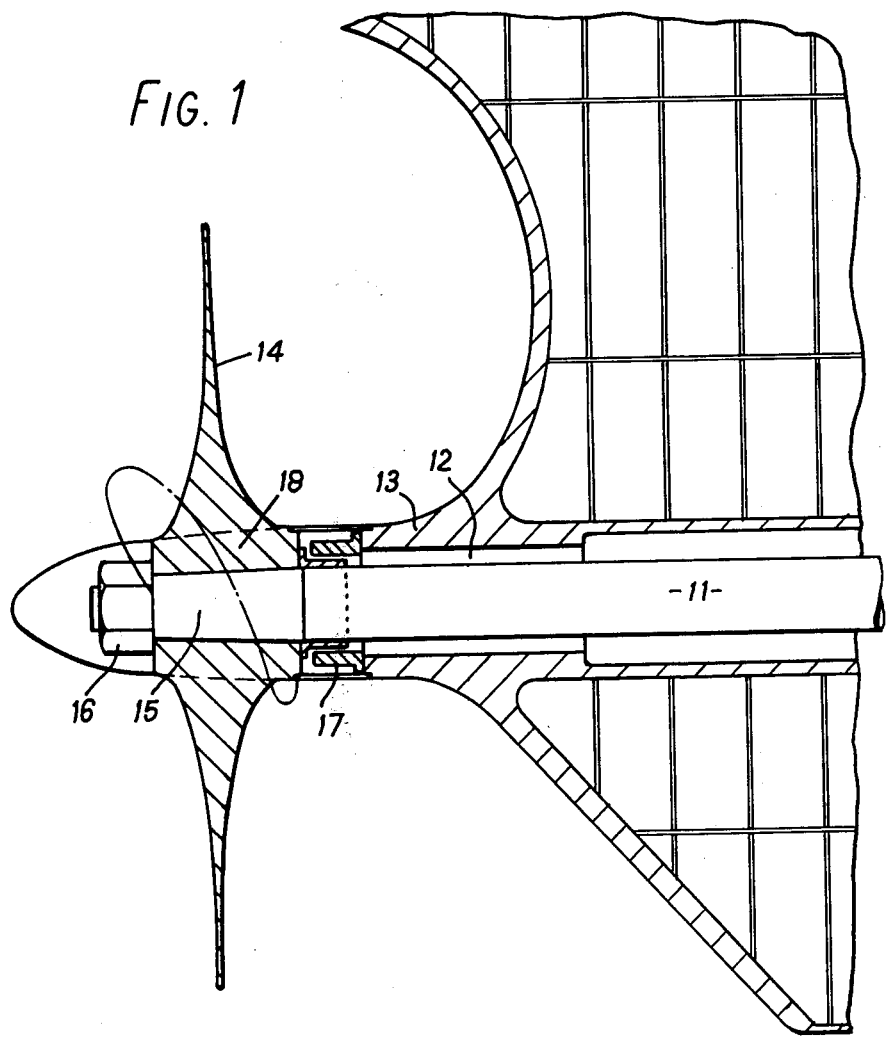
FIG. 1 shows a longitudinal section through the stern of a ship illustrating a typical shafting arrangement.

Referring to FIG. 1, this shows part of a conventional shafting arrangement of a ship. A tailshaft 11 is mounted for rotation in a stern bearing bush 12, which may be white metal lined or of bonded asbestos construction, secured within the stern frame boss 13. The propeller 14 is force-fitted onto the tapered conical end 15 of the tailshaft 11 and secured in place with a nut 16. A sealing arrangement 17 is mounted around the tailshaft between the propeller boss 18 and the bearing bush 12 providing a seal between the tailshaft and the stern frame boss 13 to prevent sea water entering the stern bearing and to prevent lubricating oil leaking from the bearings.

Referring now to FIGS. 2 and 3 these show a first type of sealing arrangement according to the invention, FIG. 2 showing the arrangement in the new condition and FIG. 3 showing it in the worn condition.

The sealing arrangement of FIGS. 2 and 3 comprises a flanged ring 51 of spheroidal graphite cast iron vacuum impregnated with P.T.FE. and sealed against corrosion which is bolted to the forward end of the propeller boss 52 and runs concentric with the tailshaft 53. A sealing ring 54 is trapped between the ring 51 and the tailshaft 53 in the normal manner to prevent sea water entering between the tailshaft and the ring 51. Dovetailed between the radial flange 55 on the ring 51 and a clamping ring 58 are two wear rings 56 and 57 of bonded asbestos construction. The clamping ring 58 and the wear rings 56 and 57 are divided diametrically to enable them to be fitted around the ring 51. The wear rings 56 and 57 provide two radially extending rubbing surfaces on opposite sides of the flange 55.

Two stainless steel wear rings 59 and 60 are held against the radial surfaces of the wear rings 56 and 57 respectively by means of corrugated annular diaphragms 61. The diaphragms 61 are torsionally stiff but axially flexible and yet have a diaphragm stiffness which will withstand any hydrostatic or hydrodynamic pressure which they are likely to meet in service as a ship's stern bearing seal. The diaphragms 61 consist of a radially corrugated strip or strips of hard brass, monel or other suitable metallic or GRP material. The depth and pitch of the corrugations are such as to provide adequate flexibility to permit an adequate axial displacement of the inner periphery in relation to the outer periphery. Such deflection must be more than adequate to cope with the wear of the face-sealing elements 56 and 57, 59 and 60, and the axial displacement of the propeller relative to the hull—brought about by differential expansion of the shafting as well as that due to the static and dynamic deflections of the thrust collar and thrust block of the thrust bearings.

The diaphragm 61 is preferred to have within itself an adequate reserve of elasticity to act as a spring such that the elements 56 and 59 and 57 and 60 of the face seal will remain firmly in contact under the maximum loss of contact pressure resulting from the above mentioned factors. The hydrostatic pressure of the sea and oil acting on the diaphragms 61 also serves to assist in maintaining the rubbing seal elements in contact.

The diaphragms 61 have bonded nitrile rubber protection all over and at the inner and outer peripheries have axially extending nylon-fibre reinforced flexible tongue rings 63 and 64 integrally moulded in place and keyed into circumferential grooves 65 and 66. The diaphragms 61 may be split across a diameter to simplify the assembly on the shaft 53, the join being closed by rubber-covered radial clips which are secured in place by adhesive. The flexible tongue rings 63 at the outer periphery are secured to a gland housing 67 secured to the stern frame boss 41, and the flexible tongue rings 64 at the inner periphery are secured to the wearing rings 59 and 60. The tongue rings permit flexing of the diaphragms 61 without applying any significant torsion to the wear rings 60 and 61.

It will be noted that there are two face seals, an outer one for sea water and an inner one for oil. Between the seals is a void space 68 at atmospheric pressure which is permanently drained by a suitable duct 69 extending through the gland housing 67, the stern bearing 41, and the afterpeak bulkhead (not shown) into the ship. The line 42 indicates diagrammatically the continuation of the duct 69 into the ship. The duct is arranged to discharge through a tun-dish tell-tale indicated diagrammatically at 40 on the way to the engine room bilge so that the performance of the seals can be monitored by the ship's staff from within the ship. The leakage past the sea water seal is normally around 100 ccs per hour which appears as a continuous drip into the tun dish 40 observable by the ship's staff. As long as these drips occur they know that there is no possibility of leaking oil into the sea. The oil in the bearing bush 43 is pressurised by means of a header tank which is four feet above the shaft height. Because of this relatively low pressure and the high viscosity of the lubricating oil used, the weep of oil between the oil seal 57 and 60 should be hardly discernible. If the oil seal is damaged oil will appear at the tun dish.

Figure 4:
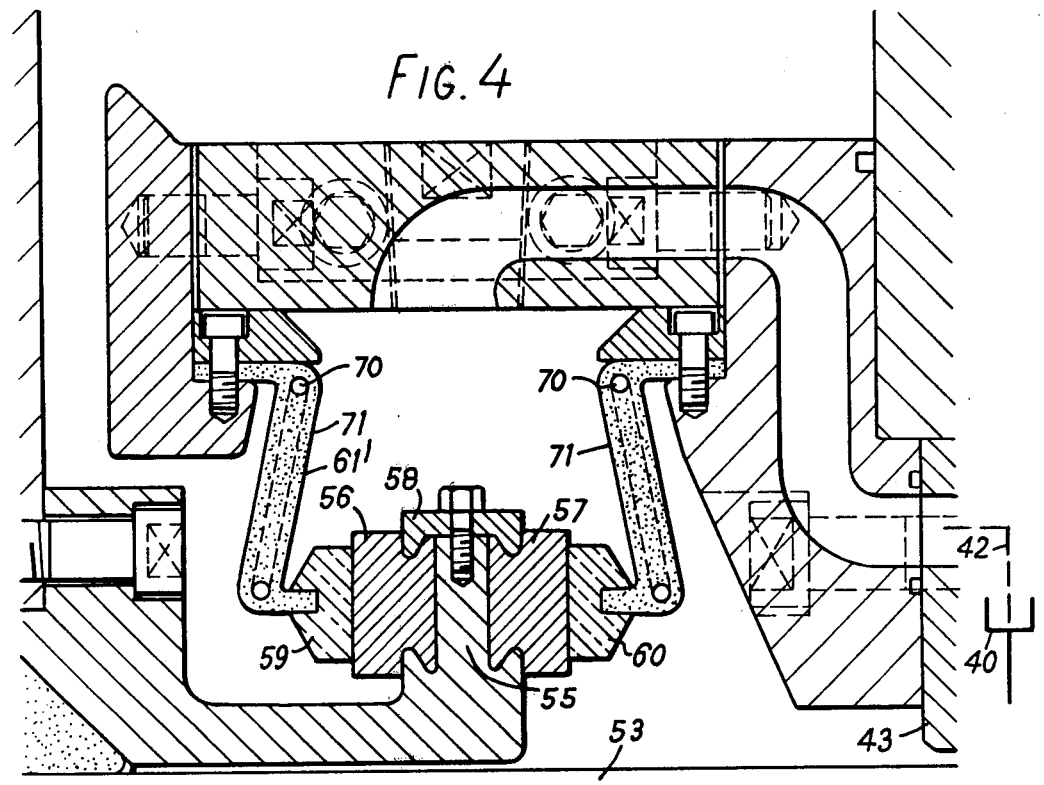
FIG. 4 shows a modification of the first type of sealing arrangement of FIG. 3 in the new condition.
Figure 5:
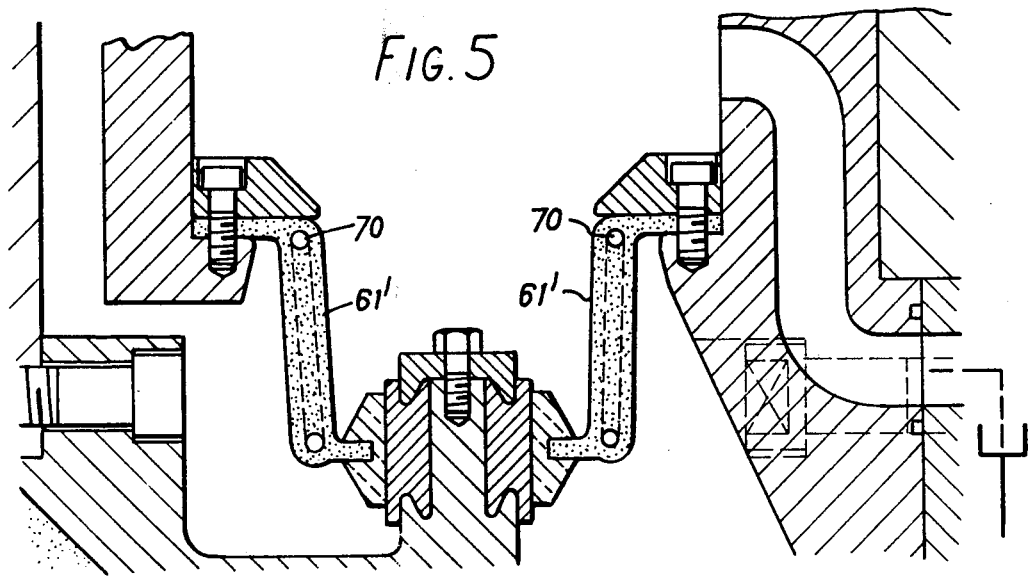
FIG. 5 shows the arrangement of FIG. 4 in the worn condition.

FIGS. 4 and 5 show a slightly cheaper modification of the sealing arrangement of FIGS. 2 and 3 in which the diaphragms 61' are formed by a steel wire convoluted spring 70 embedded into a casette 71 of reinforced nitrile rubber. Here again the assembly is conically deformed and set under stress to provide and maintain the sealing pressure between the elements of the face seal. Other parts are identical to those in the other design and bear the same reference numerals.

It will be appreciated that further modifications of this design are possible. For example the biasing of the wearing rings 59 and 60 towards the wear rings 56 and 57 may be achieved by the provision of separate springs acting on the diaphragms rather than by stress inherent in the positioning of the diaphragms.

Referring now to FIGS. 6 and 7 these show a third design of sealing arrangement. These drawings show a ship's propeller tailshaft 80 onto which a propeller boss 81 has been force fitted. A sleeve 82 of high duty cast iron (SGCI) vacuum impregnated with P.T.F.E. to be rust free is bolted to the forward face of the propeller boss 81. An "O" ring seal 83 is trapped between the sleeve, the forward end of the boss, and the tailshaft. A split wearing ring 84 of stainless cast iron is rigidly secured by a number of stainless steel socket screws 85 into the Vee groove 86 turned into the sleeve 82, trapping a pair of rubber "O" rings 87. A pair of split wear rings 88 of bonded asbestos material are secured into a pair of conical rings 89 which trap sealing "O" rings 90. The conical rings are bonded to the inner leg of a flexible reinforced nitrile rubber hinge ring 91 which is folded to have a constant "V" or "U" shaped cross-section throughout its circumference. The radial working faces of the wearing rings 88 are kept in rubbing contact with the opposite radial faces of the stainless cast iron wearing ring 84 by the simple expedient of providing a similar conical landing for the other leg of the aforementioned hinge ring 91 to bear against. It can be seen that the tendency for the hinge ring 91 to unfold and "run down" the two concentric cones, produces translatory movement of the attached wear rings 88 towards each other. To increase the translatory force a number of flat spring steel strips or piano wires are included in the reinforcement of the hinge ring 91, and/or continuous resilient annular tube 92 with specially wound flat piano wire strip may be built into the hinge ring 91. The outer leg of the hinge ring 91 is secured by screws to a gland housing 93 of the vacuum impregnated cast iron. The housing consists of three sections 93a, 93b, and 93c spigotted and bolted together. 93c is secured rigidly to the stern frame boss. The central section 93b is split horizontally so that it can be removed to provide the access necessary for renewing the wearing elements 84 and 88 of the seal. The space 95 which is between the two U-shaped hinge rings is retained as a void space which is drained from the top through drain holes 94 provided in the housing sections 93b and 93c. The drain outlet continues through a drain tube contained within the drain slot at the 6 o'clock position which is usually provided in the outer surface of the most stern bearing bushes in ships and thence through the afterpeak bulkhead into the ship's bilge or through switchcock 97 into a drain tank 98. A tun-dish indicated diagrammatically at 96 is provided in the circuit at the bulkhead so that ship's engineers may observe the drip of sea water which will leak past the aftermost or outboard seal—elements 88 and 84 at a rate of approximately 100 ccs per hour.

To assist in the dismantling of the seal for the purpose of renewing the wearing rings, a special caliper tool indicated diagrammatically in dotted lines at 99 is introduced through each of three to six (depending on seal size) radial inspection holes 100. By screwing in the tool—using the screwed holes for the inspection plugs—it can be seen that the two wear rings 88 will be pushed apart to their full extent. From 3 to 6 radial locating rods 101 are introduced through holes 102 in the housing and corresponding holes 103 in the inner end of the "V" shaped hinge 91 to hold the two wear rings 88 in this fully retracted position while the caliper tool 97 is removed. The central split housing ring 93b is then removed and the wear rings 88 and 84 are renewed. FIG. 7 shows the arrangement with the seal stripped down for overhaul—a matter of a few hours work carried out during a normal dry docking.

By virtue of the fact that the "V" or "U" shaped hinge ring 91 and resilient annular tube 92 are located by internal and external coned restraints, the thrust between the wearing rings 88 and 84 remains substantially constant even though the shaft may have large axial static and dynamic movements. The reason for this is that the outer surface of the "V" hinge ring 91 will "run down" the slope by the same amount as the inner surface "runs-up" the same slope. This is a most important and unique feature of the seal. The seal arrangement is probably the most compact of any on the market, which enable the tailshaft bending stresses to be reduced by reducing the propeller overhang. It is also cheap to produce. The seal is pollution free. It cannot leak oil into the sea unless seriously smashed. Damage can be detected instantly by the dramatic increase in sea water leakage. The overhaul and replacement of wearing parts can be done in say two hours at normal dry docking, and does not involve shafting or propeller. The remote ends of the "V" shaped hinge ring may be "faired" so that marine growth cannot affect the operation of the seal. Furthermore by injecting an antifouling poison of a high specific gravity into the void space by means of a small header tank positioned below the top of the void space the void space can be kept free of any marine growth in the event of microscopic spores surviving past the grinding action of the face seal.

Although the invention has been particularly described in relation to the sealing problems of the tailshaft of large ships, it will be appreciated that it can be applied to a great variety of different sealing problems.

I claim:

1. A sealing arrangement for a rotary shaft mounted in bearings and structure surrounding said shaft, said sealing arrangement comprising:

two rubbing seals mounted between the shaft and structure supporting the shaft including parts carrying the rubbing surfaces of each seal, said parts being mounted for relative movement towards and away from one another and resiliently biassing means for biassing said parts into contact with one another; said parts including a flange with radial surfaces carried on said shaft and two rubbing rings carried by said structure and surrounding said shaft, said rings being mounted for axial movement relative to the flange, said biassing means biassing said rings toward said flange and for each seal one of said rubbing surfaces being formed by a radial surface of said flange, the other rubbing surface being provided by one of said rings; two conical rings, each conical ring carrying a respective one of the rubbing rings, two conical surfaces on the supporting structure, and two resilient flexible hinge rings, each hinge ring being stressed to have a generally U-shaped cross-section with inner and outer limbs, the inner limb of each hinge ring being secured to a respective one of the conical rings which carry the rubbing rings and the outer limb of each ring being supported against a respective one of the conical surfaces on the supporting structure;

a void space between said seals; and means for indicating ingress of liquid into said void space.

2. A sealing arrangement according to claim 1 in which the said one rubbing surface of the two seals comprise generally radially-extending surfaces on opposite sides of the same flange.

3. A sealing arrangement according to claim 2 including a sleeve surrounding said shaft, a static sealing member, said static seal being sealed between said sleeve and said shaft and said flange being mounted on said sleeve.

4. A sealing arrangement according to claim 1 in which the rubbing surfaces of the seal are provided by dissimilar materials one of which is metallic and the other of which is non-metallic but compatible.

5. A sealing arrangement according to claim 4 in which the other material is an asbestos composition.

6. A sealing ring according to claim 1 in which the hinge ring is made of rubber with spring metal inserts.

7. A sealing arrangement according to claim 1 including a resilient tube placed between the inner and outer limbs of the U-shaped hinge ring to increase the axial force exerted by the hinge ring.

8. A sealing arrangement according to claim 1 in which the rubbing rings and the parts which carry them are divided across a diameter to facilitate replacement of the seals.

9. A sealing arrangement having a rotary shaft mounted in bearings and structure surrounding the shaft, the shaft comprising a tailshaft for a marine vessel, said sealing arrangement comprising:

two rubbing seals mounted between the shaft and structure supporting the shaft;

a void space between said seals, wherein one seal is placed between the void space and the sea water and the other seal is placed between the void space and the lubricating oil of the bearings, said void space having a pressure less than the pressure on the other sides of both seals; and means for indicating ingress of liquid into said void space.

10. A sealing arrangement for a rotary shaft mounted in bearings with structure surrounding said shaft, said sealing arrangement comprising:

radial surfaces carried on said shaft;

two conical ring means carried by said structure and surrounding said shaft, said ring means being mounted for axial movement relative to respective ones of said radial surfaces, each of said ring means carrying a rubbing surface, two conical surfaces on the supporting structure; two resiliently flexible biassing rings for biassing respective ones of said conical ring means toward said respective ones of said radial surfaces so that said rubbing surfaces on said ring means engage said respective radial surfaces to form two rubbing seals between said shaft and said structure supporting said shaft, each said resiliently flexible biassing rings comprising an annular strip of resilient material, stressed to have a generally U-shaped cross-section, the inner limb of the cross-section bearing against the conical ring means and the outer limb bearing against said conical surface;

a void space between said seals; and means for indicating ingress of liquid into said void space.

* * * * *